United States Patent
Song et al.

(10) Patent No.: US 11,200,362 B2
(45) Date of Patent: *Dec. 14, 2021

(54) 3D RESIST PROFILE AWARE RESOLUTION ENHANCEMENT TECHNIQUES

(71) Applicant: Synopsys, Inc., Mountain View, CA (US)

(72) Inventors: Hua Song, San Jose, CA (US); Cheng En Wu, Hsinchu (TW); James P. Shiely, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 15/488,345

(22) Filed: Apr. 14, 2017

(65) Prior Publication Data

US 2017/0220723 A1 Aug. 3, 2017

Related U.S. Application Data

(63) Continuation of application No. 14/712,663, filed on May 14, 2015, now Pat. No. 9,646,127.

(51) Int. Cl.
| | |
|---|---|
| *G06F 30/39* | (2020.01) |
| *G06F 30/392* | (2020.01) |
| *G03F 1/36* | (2012.01) |
| *G03F 1/80* | (2012.01) |
| *G03F 7/20* | (2006.01) |
| *G06F 119/18* | (2020.01) |

(52) U.S. Cl.
CPC ............. *G06F 30/392* (2020.01); *G03F 1/36* (2013.01); *G03F 1/80* (2013.01); *G03F 7/705* (2013.01); *G03F 7/70441* (2013.01); *G06F 30/39* (2020.01); *G06F 2119/18* (2020.01)

(58) Field of Classification Search
CPC ........ G03F 7/705; G03F 1/36; G03F 7/70441; G03F 7/70625; G03F 7/70683; G03F 7/70125; G03F 7/70433; G03F 7/70516; G03F 1/80; G06F 17/5081; G06F 17/5009; G06F 17/5068; G06F 17/5072; G06F 2217/12; G06F 17/12; G06F 30/392; G06F 30/39; G06F 2119/18
USPC .................................. 716/50–55; 430/5, 30
See application file for complete search history.

(56) References Cited

U.S. PATENT DOCUMENTS

| | | | | |
|---|---|---|---|---|
| 9,646,127 | B2 * | 5/2017 | Song | ................. G06F 17/5068 |
| 2011/0224963 | A1 * | 9/2011 | Isoyan | ................... G03F 7/705 |
| | | | | 703/14 |
| 2012/0179282 | A1 * | 7/2012 | Sarma | ................. G06F 17/5068 |
| | | | | 700/98 |
| 2013/0204594 | A1 * | 8/2013 | Liu | ..................... G06F 17/5009 |
| | | | | 703/2 |

(Continued)

*Primary Examiner* — Nghia M Doan
(74) *Attorney, Agent, or Firm* — Park, Vaughan, Fleming & Dowler LLP; Laxman Sahasrabuddhe (57) ABSTRACT

Systems and techniques for three-dimension (3D) resist profile aware resolution enhancement techniques are described. 3D resist profile aware resolution enhancement models can be calibrated based on empirical data. Next, the 3D resist profile aware resolution enhancement models can be used in one or more applications, including, but not limited to, lithography verification, etch correction, optical proximity correction, and assist feature placement.

15 Claims, 5 Drawing Sheets

(56) References Cited

U.S. PATENT DOCUMENTS

2016/0078166 A1* 3/2016 Unai .................... G03F 1/70
  716/51
2016/0231654 A1* 8/2016 Hsu .................... G03F 7/70483

* cited by examiner

3D RESIST PROFILE AWARE RESOLUTION ENHANCEMENT TECHNIQUES

RELATED APPLICATIONS

The present application is a continuation of, and claims priority to, U.S. patent application Ser. No. 14/712,663, entitled "3D Resist Profile Aware Etch-Bias Model," by inventors Hua Song, Cheng En Wu and James P. Shiely, which was filed on 14 May 2015, and which is herein incorporated by reference in its entirety for all purposes.

BACKGROUND

Technical Field

This disclosure relates to electronic design automation (EDA). More specifically, this disclosure relates to a three-dimensional (3D) resist profile aware etch-bias model.

Related Art

Rapid advances in computing technology have made it possible to perform trillions of computational operations each second on data sets that are sometimes as large as trillions of bytes. These advances can be attributed to the dramatic improvements in semiconductor manufacturing technologies, which have made it possible to integrate tens of millions of devices onto a single chip.

As semiconductor design enters the deep submicron era, process model accuracy and efficiency is becoming increasingly important. Inaccuracies in the process model negatively affect the efficacy of downstream applications. For example, inaccuracies in the etch-bias model can cause lithography verification to be inaccurate. If the process model is computationally inefficient, it can increase the time-to-market for an integrated circuit, which can cost millions of dollars in lost revenue. Hence, it is desirable to improve the accuracy and the efficiency of a process model.

SUMMARY

Some embodiments disclosed herein feature a 3D resist profile aware etch-bias model. Some embodiments determine post-etch patterns on a semiconductor wafer when a photolithography mask is used to print target patterns on the semiconductor wafer by using a semiconductor manufacturing process, wherein the photolithography mask includes mask patterns, and wherein the semiconductor manufacturing process includes a photolithography process and an etching process. Upon receipt of mask patterns, these embodiments can determine post-development patterns based on the mask patterns and a photolithography model that models the photolithography process. Next, the embodiments can compute etch biases at a set of evaluation points based on the post-development patterns, wherein said computing uses an etch-bias model, and wherein the etch-bias model includes at least one sidewall slope term that is a function of a sidewall slope of a post-development resist layer. For example, the function could be the reciprocal of the sidewall slope. The embodiments can then determine the post-etch patterns by adjusting the post-development patterns based on the computed etch biases. The post-etch patterns can be compared with the target patterns, and if said comparing indicates that the post-etch patterns substantially match the target patterns, the embodiments can determine that the photolithography mask can be used for printing the target patterns on the semiconductor wafer by using the semiconductor manufacturing process.

Some embodiments feature techniques and systems to determine mask patterns for printing target patterns by using a semiconductor manufacturing process, wherein the semiconductor manufacturing process includes a photolithography process and an etching process. Upon receiving the target patterns, the embodiments can compute etch biases at a set of evaluation points based on the target patterns, wherein said computing uses an etch-bias model, and wherein the etch-bias model includes at least one sidewall slope term that is a function of a sidewall slope of a post-development resist layer (e.g., the function could be the reciprocal of the sidewall slope). The embodiments can then determine retargeted patterns by adjusting the target patterns based on the computed etch biases. Next, the embodiments can determine mask patterns based on the retargeted patterns. Specifically, mask patterns can be determined by modifying the retargeted patterns by using one or more resolution enhancement techniques, such as, an optical proximity correction (OPC) process, an assist feature (AF) placement process, or both the OPC and the AF placement process. Note that the OPC process and the AF placement process can determine the mask patterns by iteratively modifying the retargeted patterns and/or adding assist features until the post-development patterns predicted by a photolithography model substantially match the retargeted patterns. Next, the process can create a photolithography mask containing the mask patterns.

Some embodiments feature techniques and systems to determine mask patterns for printing target patterns by using a semiconductor manufacturing process, wherein the semiconductor manufacturing process includes a photolithography process and an etching process. Specifically, the embodiments can receive a first set of mask patterns (e.g., target patterns, or retargeted patterns that are determined by using an etch-bias model). Next, the embodiments can determine a second set of mask patterns based on the first set of mask patterns, wherein said determining minimizes an objective function that includes at least one term based on (1) a difference between the predicted CD and the target CD at one or more resist heights, (2) a deviation of a predicted resist profile from an ideal resist profile, or (3) a combination thereof. The embodiments can then create a photolithography mask containing the mask patterns.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

Circuit designs are typically created using an EDA flow. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., Verilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. Some embodiments disclosed herein can be used during resolution enhancement. During mask data preparation, the design can be "taped-out" to produce masks, which are used during fabrication.

Overview

In semiconductor device manufacturing, etching is a critical process for patterning device structures. Usually, a masking pattern is formed over the material in which the device pattern is to be formed. In a typical example, patterns are formed in a photoresist layer by using a photolithography process, with the developed areas exposing the underlying material and the undeveloped photoresist serving as a mask to resist (i.e., prevent or protect against) etching. The photoresist pattern is then transferred to the material under the photoresist layer by etching, resulting in trenches and holes in the exposed parts. Once the etching process is completed, the photoresist layer is stripped, and the patterning step is complete.

Due to various reasons, this pattern transferring process by etching usually causes distortions. This distortion is commonly represented by an etch bias, the difference between the post-etch CD and the pre-etch resist CD.

Etch bias is typically compensated for in mask synthesis. To compensate for the full chip etching effect, an accurate and fast etch model is needed to model the effect of the etching process. Due to the complexity of the etching process, usually an empirical model is used. This model typically assumes that the masking patterns (e.g., the post-development photoresist patterns) are ideal, in the sense that the sidewalls of the resist profile are 90 degrees, hence only a 2D representation of the masking patterns, e.g., its contour at a certain height, is needed in etch modeling. Typically, the characteristics of the 2D resist contour considered in etch modeling are pattern density and visible area.

However, as the device critical dimensions continue to shrink, the masking patterns are becoming less ideal. The traditional etch models that use only a 2D representation of the masking pattern fail to accurately predict etching distortions, and hence are unable to guide the compensation of etching effects during mask synthesis. The conventional models also fail to predict wafer patterning issues when the model is used in post-OPC verification. The end result is a deteriorated wafer yield. Therefore, there is a need to build accurate and compact etch models that take 3D resist profile information into consideration.

Some embodiments described in this disclosure take 3D resist profile information into consideration in etch biasing modeling. A non-vertical resist sidewall will result in the resist's lateral erosion during etching, which contributes directly to etch bias. Some embodiments described in this disclosure incorporate a sidewall slope term in the etch-bias model to capture the effect of a non-vertical resist sidewall slope. The resulting model is a more accurate etch-bias model that can be used to achieve better mask patterns through etch effect compensation. The model can also be used in post-OPC verification to detect potential patterning errors on wafer through etch simulation. Both of these applications of the improved etch-bias model can help improve wafer yield. Conventional OPC tries to minimize the CD error between the desired photoresist patterns and the patterns predicted by a photolithography model. Some embodiments described herein add a sidewall slope term to the objective function that OPC tries to optimize. In other words, in these embodiments, OPC not only tries to minimize the CD error, but it also tries to ensure that the sidewalls of the photoresist layer are vertical.

Three-Dimensional (3D) Resist Profile Aware Etch-Bias Model

A process model—e.g., a photolithography model, an etch-bias model, etc.—models the behavior of one or more semiconductor manufacturing processes, which can include complex physical and chemical interactions. A process model can be determined by fitting coefficients to empirical data. The empirical data can be generated by applying the semiconductor manufacturing processes that are being modeled to one or more test layouts.

Figure 1:
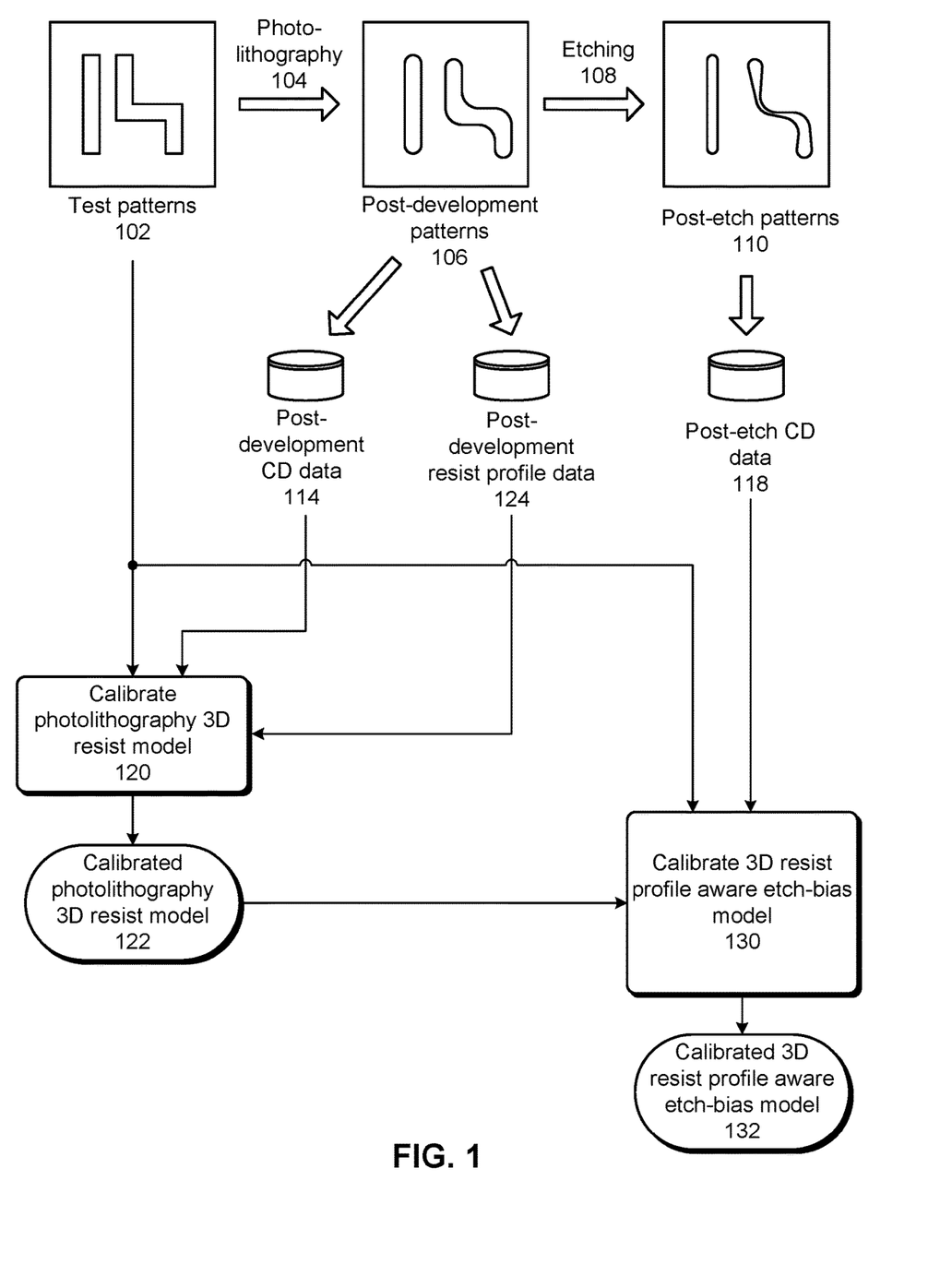
FIG. 1 illustrates how a 3D resist profile aware etch-bias model can be determined in accordance with some embodiments described herein.

FIG. 1 illustrates how a 3D resist profile aware etch-bias model can be determined in accordance with some embodiments described herein. Test patterns 102 in a test mask can be transferred to a resist layer by using photolithography process 104. Post-development patterns 106 represent the patterns on the resist layer after the photolithography process has been completed. Post-development resist profile data can be collected based on the post-development patterns 106. For example, an atomic force microscope (AFM) can be used to collect post-development resist profile data. Alternatively, the wafer can be cut and a cross-sectional image (e.g., by using a scanning electron microscope (SEM)) of the wafer can be used to obtain the 3D profile data. In addition to the 3D profile data, the post-development critical dimension (CD) data can also be collected, e.g., by measuring CDs in an SEM image of the wafer.

Next, etching process 108 can be used to transfer post-development patterns 106 from the resist layer to the substrate to obtain post-etch patterns 110. Post-etch CD data 118 can be obtained using, for example, an SEM image to measure CDs of post-etch patterns 110.

Test patterns 102, post-development CD data 114, and post-development resist profile data 124 can be used to calibrate a photolithography 3D resist model (operation 120), thereby obtaining calibrated photolithography 3D resist model 122. Operation 120 can involve fitting a set of coefficients in an uncalibrated photolithography 3D resist model so that the post-development CD data 114 and post-development resist profile data 124 matches the CD and resist profile predicted by the photolithography 3D resist model. Calibrated photolithography 3D resist model 122 can be used to predict post-development patterns 106 (both CD and 3D resist profile) for a given photolithography mask.

In some embodiments, the photolithography 3D resist model can represent some chemical or material density at a given point. For example, a photolithography 3D resist model can take the form $I(x, y, z)$, where $I(x, y, z)$ represents some chemical or material density at point $(x, y, z)$, where x and y are the coordinates on the wafer plane, and z represents the vertical location along the height of the resist. The post-development resist surface consists of points $(x, y, z)$ that satisfy the equation $I(x, y, z) = C$, where C is a threshold value.

Next, an uncalibrated 3D resist profile aware etch-bias model can be calibrated (operation 130) to obtain calibrated 3D resist profile aware etch-bias model 132 by using post-etch CD data 118 and the calibrated photolithography 3D resist model 122. Specifically, the calibrated 3D resist profile aware etch-bias model 132 can include at least one function of the sidewall slope, for example, the reciprocal of the sidewall slope. The physical resist sidewall slope $S_z$ at resist height z can be given by:

$$S_z = \sqrt{a^2 + b^2}, \quad a = \frac{-I'_x(x, y, z)}{I'_z(x, y, z)}, \quad b = \frac{-I'_y(x, y, z)}{I'_z(x, y, z)},$$

where $I'_x(x, y, z)$, $I'_y(x, y, z)$, and $I'_z(x, y, z)$, are the partial derivatives of 3D resist model $I(x, y, z)$ with respect to x, y, and z, respectively. The partial derivative with respect to z can be approximated as follows (the partial derivatives with respect to x and y can be computed using other approaches—e.g., analytical approaches—but can also be computed using the following approach):

$$I'_z(x, y, z) \approx \frac{I(x, y, z + \Delta z) - I(x, y, z)}{\Delta z},$$

where $\Delta z$ is a small change in z.

The calibrated 3D resist profile aware etch-bias model 132 can include other terms, such as a constant bias, visible area term, blocked area term, short range density term, and a long range density term. For example, the calibrated 3D resist profile aware etch-bias model 132 can be represented as a summation of weighted terms: etch_bias=c0+c1×Pshort_dens+c2×Plong_dens+c3×Pvisible_area+c4×Pblocked_area+c5/$S_z$+(higher order terms), where "c0" is the constant bias, "Pshort_dens" is the short range density function, "Plong_dens" is the long range density function, "Pvisible_area" is the visible area function, "Pblocked" is the blocked area function, "$S_z$" is the sidewall slope at a given resist height (e.g., at the bottom of the resist layer), and "higher order terms" are terms that can include squares, cubes, etc., of the sidewall slope, short range density function, etc. In some embodiments the etch-bias model can include multiple sidewall slope terms that correspond to the sidewall slope of the 3D resist profile at different heights of the resist layer (instead of the sidewall slope at only one resist height as in the above example) and/or other function forms of the sidewall angles or slopes.

The short range density function and the long range density function correspond to a pattern density within a small and large ambit of a given point in the photolithography mask. The visible and blocked area functions correspond to the visible and blocked areas at a given evaluation point in the photolithography mask. In addition to the above terms, terms that correspond to other 3D resist profile characteristics, such as multiple sidewall angles/slopes, remaining resist thickness or ratio, and resist cross section area or ratio, etc. can also be included in the etch-bias model.

In some embodiments, calibration operation 130 can (1) use the calibrated photolithography 3D resist model 122 to compute the CD of the predicted post-development patterns and the sidewall slope based on test patterns 102, (2) compute the values of the various terms in the etch-bias model, and (3) use the post-etch CD data 118 to fit the coefficients so that the etch bias computed by the etch-bias model is substantially equal to the difference between the post-development CD data 114 and the post-etch CD data 118.

For example, in the above example, the coefficients "c0" through "c5" (and any other coefficients that are in the higher order terms) can be fitted in operation 130. In some embodiments, the coefficients are fitted in a particular order, i.e., a first set of coefficients is fitted, and these coefficient values are fixed; then, the next set of coefficients is fitted, and those coefficient values are fixed, and so forth. Some embodiments fit the coefficients in the following order: (1) constant bias ("c0" in the above example) and the sidewall slope coefficient ("c5" in the above example) are fitted together, (2) visible area coefficient ("c3" in the above example) is fitted next, (3) short range density coefficient ("c1" in the above example) is then fitted, and (4) long range density coefficient ("c2" in the above example) is fitted. Next, the process can fit any remaining coefficients (e.g., "c4" and other coefficients in the higher order terms in the above example).

Figure 2:
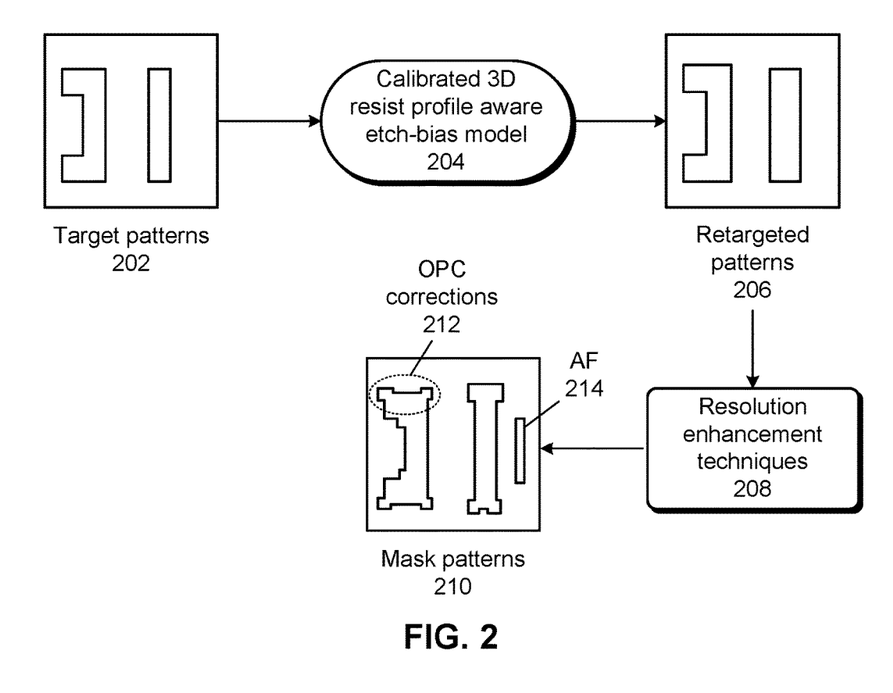
FIG. 2 illustrates how a 3D resist profile aware etch-bias model can be used to create mask patterns in accordance with some embodiments described herein.

Calibrated 3D resist profile aware etch-bias model 132 can be used in a number of applications during the design and manufacture of a semiconductor chip. For example, FIG. 2 illustrates how a 3D resist profile aware etch-bias model can be used to create mask patterns in accordance with some embodiments described herein. Target patterns 202 are the patterns that are desired to be printed on the substrate (target patterns 202 are also known as the design intent). Calibrated 3D resist profile aware etch-bias model 132 can be used to retarget the design intent to produce retargeted patterns 206. Retargeting refers to an operation where a given design intent is modified so that applying an etching process to the modified design intent results in the design intent. In FIG. 2, if the post-development patterns match the retargeted patterns 206, then the post-etch patterns are expected to match the target patterns 202. Retargeting can be performed by (1) dividing the polygons in target patterns 202 into segments, (2) computing an etch bias for each segment, e.g., by evaluating the calibrated 3D resist profile aware etch-bias model 132 at the mid-point of each segment (this evaluation can either use target patterns 202, or iteratively modify target patterns 202 to obtain a set of patterns that are expected to produce target patterns 202 after etch), and (3) displacing each segment based on the etch bias for the segment. Next, one or more resolution enhancement techniques, e.g., OPC, AF placement, etc., can be applied to the retargeted patterns 206 to obtain mask patterns 210. Note that mask patterns 210 include OPC corrections 212 and assist feature 214. Mask patterns 210 can then be included in a photolithography mask, and the photolithography mask can be used for printing target patterns 202 on a substrate by using the semiconductor manufacturing process.

Figure 3:
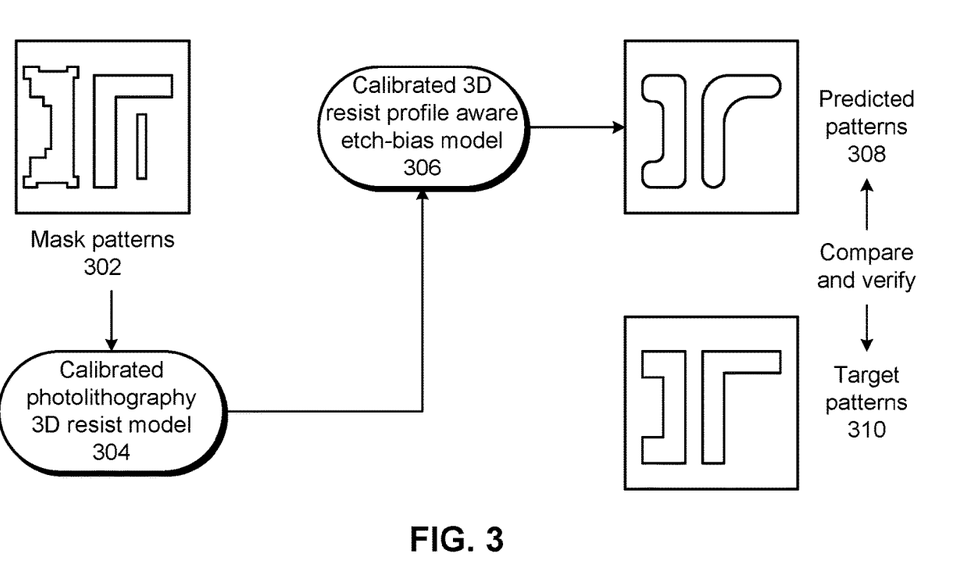
FIG. 3 illustrates how a 3D resist profile aware etch-bias model can be used to verify mask patterns in accordance with some embodiments described herein.

FIG. 3 illustrates how a 3D resist profile aware etch-bias model can be used to verify mask patterns in accordance with some embodiments described herein. Semiconductor manufacturing processes use very sophisticated and costly equipment, and therefore printing a mask pattern can be a very costly affair. Therefore, before a mask pattern is printed, it is desirable to verify if the final pattern that is expected to appear on the substrate matches the design intent. A calibrated 3D resist profile aware etch-bias model can be used in such verification applications. Specifically, mask patterns 302 can be provided as an input to calibrated photolithography 3D resist model 304 to produce a post-development 3D resist profile. The post-development 3D resist profile can then be provided as an input to calibrated 3D resist profile aware etch-bias model 306 to determine etch biases. Next, the post-development patterns, e.g., the 2D contour of the 3D resist profile at a certain height, can be adjusted using the etch biases determined by the calibrated 3D resist profile aware etch-bias model 306 to obtain predicted patterns 308. Predicted patterns 308 can then be compared with target patterns 310 to verify mask patterns 302. Specifically, if predicted patterns 308 substantially match target patterns 310, then the system can determine to use mask patterns 302 in the semiconductor manufacturing process. On the other hand, if predicted patterns 308 do not substantially match target patterns 310, then the system can determine not to use the mask patterns 302 in the semiconductor manufacturing process.

Figure 4:
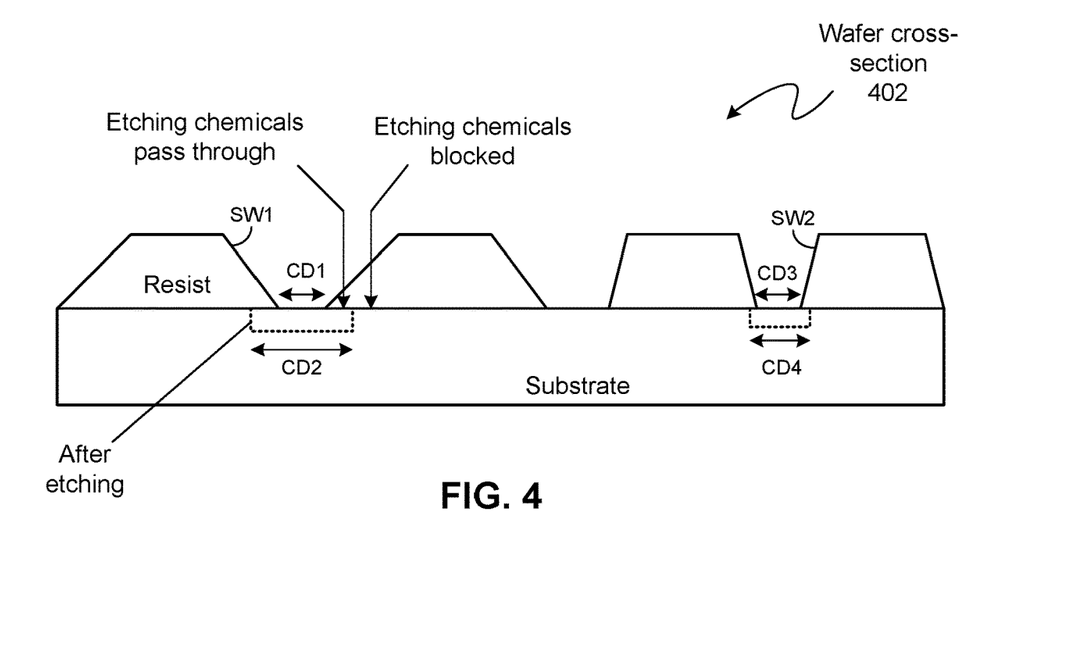
FIG. 4 explains a rationale for using a sidewall slope term in an etch-bias model in accordance with some embodiments described herein.

FIG. 4 explains a rationale for using a sidewall slope term in an etch-bias model in accordance with some embodiments described herein. Wafer cross-section 402 illustrates the post-development resist profile on top of the substrate. CD1 and CD3 are two post-development CD values, and CD2 and CD4 are the respective post-etch CD values. The dotted lines in the substrate represent the shape that is created after etching. The etch bias is the difference between the post-development CD and the post-etch CD. A thin resist layer may not protect the substrate from the etching chemicals. Therefore, the etch bias is expected to be greater when the resist profile has gradual slope (i.e., a smaller magnitude sidewall slope). For example, in FIG. 4, the etch bias (CD2-CD1) is greater than the etch bias (CD4-CD3), and the slope of sidewall SW1 is less than the slope of sidewall SW2. In other words, the etch bias is expected to vary with the sidewall slope, and hence adding a sidewall slope term to the etch-bias model can improve the accuracy of the etch-bias model.

Figure 5:
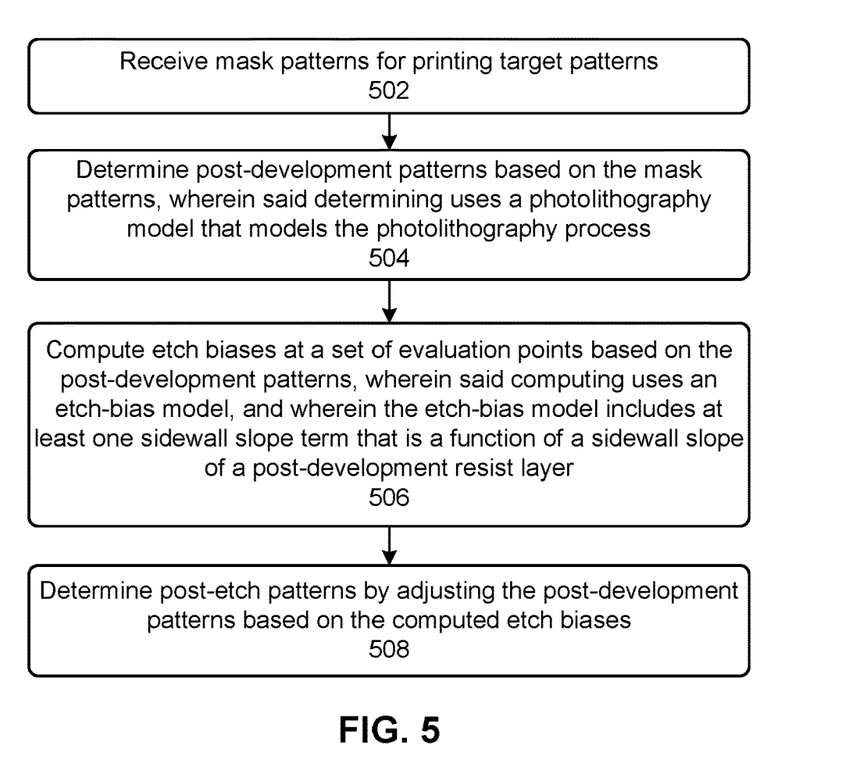
FIG. 5 illustrates a process for determining post-etch patterns on a semiconductor wafer when a photolithography mask is used for printing target patterns on the semiconductor wafer by using a semiconductor manufacturing process in accordance with some embodiments described herein.

FIG. 5 illustrates a process for determining post-etch patterns on a semiconductor wafer when a photolithography mask is used for printing target patterns on the semiconductor wafer by using a semiconductor manufacturing process in accordance with some embodiments described herein. The photolithography mask can include mask patterns, and the semiconductor manufacturing process can include a photolithography process and an etching process. The process can begin by receiving the mask patterns for printing target patterns (operation 502). Next, the process can determine post-development patterns based on the mask patterns, wherein said determining uses a photolithography model that models the photolithography process (operation 504). The process can then compute etch biases at a set of evaluation points based on the post-development patterns, wherein said computing uses an etch-bias model, and wherein the etch-bias model includes at least one sidewall slope term that is a function (e.g., the reciprocal) of a sidewall slope of a post-development resist layer (operation 506). Next, the process can determine the post-etch patterns by adjusting the post-development patterns based on the computed etch biases (operation 508). The post-etch patterns can be used for performing lithography verification. For example, the post-etch patterns can be compared with the target patterns, and if said comparing indicates that the post-etch patterns substantially match the target patterns, the embodiments can determine that the photolithography mask can be used for printing the target patterns on the semiconductor wafer by using the semiconductor manufacturing process.

Figure 6:
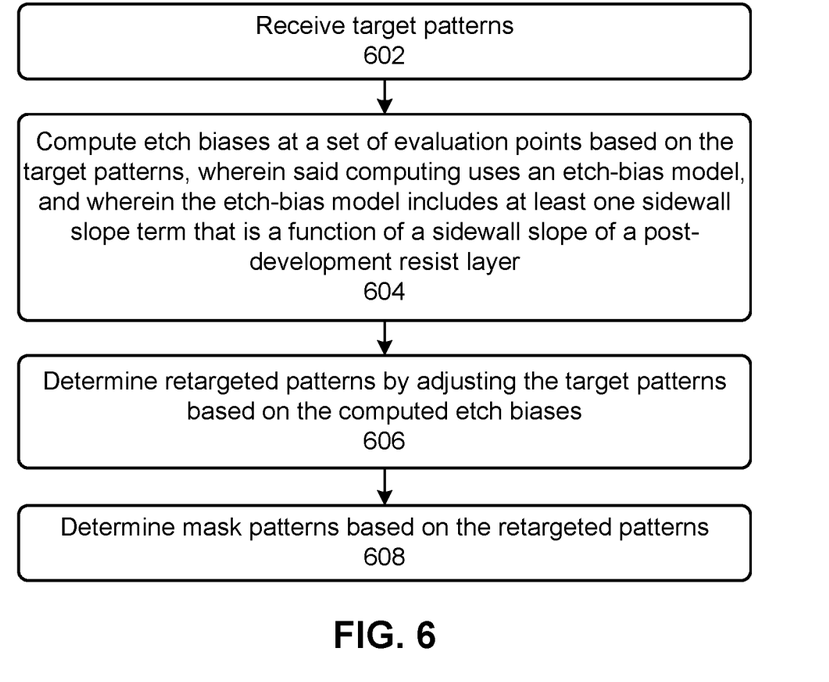
FIG. 6 illustrates a process for determining mask patterns for printing target patterns by using a semiconductor manufacturing process in accordance with some embodiments described herein.

FIG. 6 illustrates a process for determining mask patterns for printing target patterns by using a semiconductor manufacturing process in accordance with some embodiments described herein. The process can begin by receiving the target patterns (operation 602). Next, the process can compute etch biases at a set of evaluation points based on the target patterns, wherein said computing uses an etch-bias model, and wherein the etch-bias model includes at least one sidewall slope term that is a function (e.g., the reciprocal) of a sidewall slope of a post-development resist layer (operation 604). The process can then determine retargeted patterns by adjusting the target patterns based on the computed etch biases (operation 606). Next, the process can determine mask patterns based on the retargeted patterns (operation 608). Specifically, the process can perform OPC and AF placement on the retargeted patterns, wherein the OPC and AF placement processes iteratively modify the retargeted patterns and add assist features using a photolithography model.

Figure 7:
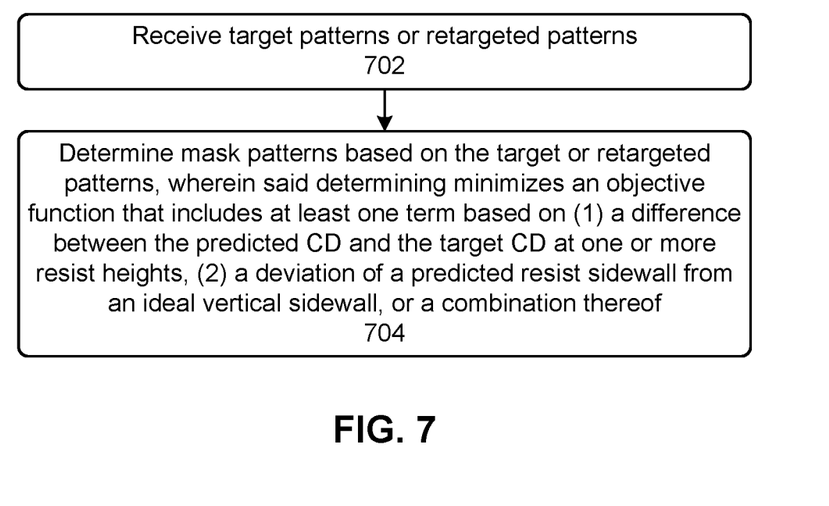
FIG. 7 illustrates a process for determining mask patterns based on target patterns in accordance with some embodiments described herein.

FIG. 7 illustrates a process for determining mask patterns based on target patterns in accordance with some embodiments described herein. The process can begin by receiving target patterns or retargeted patterns (operation 702). For example, etch biases for target patterns can be computed using an etch-bias model and the target patterns can be adjusted based on the computed etch biases to obtain the retargeted patterns. Next, the process can determine mask patterns (that include OPC corrections and AFs, etc.) based on the target or retargeted patterns, wherein said determining minimizes an objective function that includes at least one term based on (1) a difference between the predicted CD and the target CD at one or more resist heights, (2) a deviation of a predicted resist profile from an ideal resist profile, or (3) a combination thereof (operation 704). One example of a term that is based on the deviation of a predicted resist profile from an ideal resist profile is the inverse of the predicted resist sidewall slope (note that this term will be equal to zero when the predicted sidewall slope is ideal, i.e., vertical). The goal of the optimization in operation 704 is to optimize not only the CDs of the patterns at a nominal resist height but also to optimize the 3D resist profile so that the resist profile is close to ideal. Approaches for optimizing the 3D resist profile include optimizing the resist sidewall slope, optimizing the CD at multiple resist heights, or a combination thereof. Specifically, operation 704 can be used for one or more resolution enhancement techniques such as OPC and AF placement. The result of operation 704 can be a corrected mask pattern (i.e., a mask pattern with resolution enhancement features) that not only produces the desired CD values at the nominal resist height, but also produces desired resist profiles (e.g., vertical or near vertical resist sidewalls). In contrast, conventional resolution enhancement techniques ignore the 3D resist profile during resolution enhancement, e.g., OPC or AF placement.

Computer System

Figure 8:
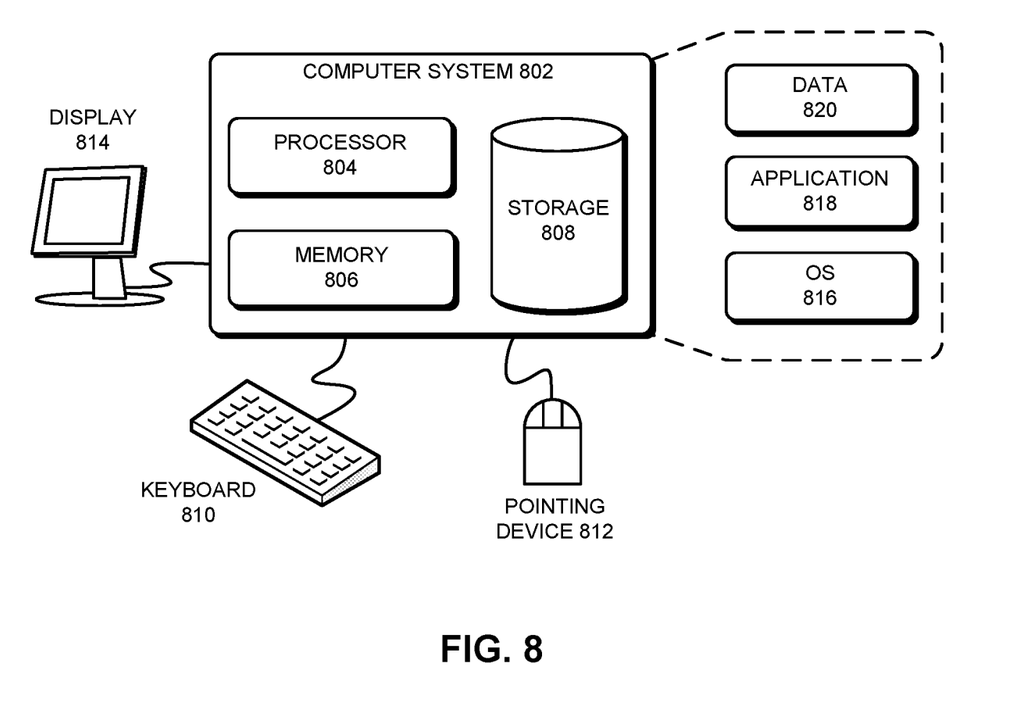
FIG. 8 illustrates a computer system in accordance with some embodiments described in this disclosure.

FIG. 8 illustrates a computer system in accordance with some embodiments described in this disclosure. Computer system 802 can include processor 804, memory 806, and storage device 808. Computer system 802 can be coupled to display device 814, keyboard 810, and pointing device 812. Storage device 808 can store operating system 816, application 818, and data 820. Data 820 can include input required by application 818 and/or output generated by application 818. Computer system 802 may automatically (or based on user input) perform one or more operations that are implicitly or explicitly described in this disclosure. For example, computer system 802 can load application 818 into memory 806, and application 818 can then be used to perform a process implicitly or explicitly described in this disclosure.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method to determine a set of mask patterns for printing a set of target patterns by using a semiconductor manufacturing process, wherein the semiconductor manufacturing process includes a photolithography process and an etching process, the method comprising:
   determining a set of retargeted patterns based on the set of target patterns; and
   determining the set of mask patterns based on the set of retargeted patterns by optimizing an objective function that comprises a measure of a deviation of a predicted three-dimensional (3D) resist profile with respect to a desired 3D resist profile, wherein the measure of the deviation of the predicted 3D resist profile with respect to the desired 3D resist profile includes an inverse of a predicted resist sidewall slope.

2. The non-transitory computer-readable storage medium of claim 1, wherein the method further comprising creating a photolithography mask containing the set of mask patterns.

3. The non-transitory computer-readable storage medium of claim 1, wherein the measure of the deviation of the predicted 3D resist profile with respect to the desired 3D resist profile includes differences between predicted critical dimensions (CDs) and target CDs at multiple resist heights.

4. The non-transitory computer-readable storage medium of claim 1, wherein determining the set of retargeted patterns based on the set of target patterns comprises:
   computing etch biases at a set of evaluation points in the set of target patterns by using an etch-bias model; and
   determining the set of retargeted patterns by adjusting the set of target patterns based on the computed etch biases.

5. The non-transitory computer-readable storage medium of claim 4, wherein the etch bias model comprises one or more of the following terms:
   a constant bias,
   a short range density function,
   a long range density function,
   a visible area function,
   a blocked area function, and
   a function of a sidewall slope of a post-development resist layer.

6. A method to determine a set of mask patterns for printing a set of target patterns by using a semiconductor manufacturing process, wherein the semiconductor manufacturing process includes a photolithography process and an etching process, the method comprising:
  a computer determining a set of retargeted patterns based on the set of target patterns; and
  the computer determining the set of mask patterns based on the set of retargeted patterns by optimizing an objective function that comprises a measure of a deviation of a predicted three-dimensional (3D) resist profile with respect to a desired 3D resist profile, wherein the measure of the deviation of the predicted 3D resist profile with respect to the desired 3D resist profile includes an inverse of a predicted resist sidewall slope.

7. The method of claim 6, further comprising creating a photolithography mask containing the set of mask patterns.

8. The method of claim 6, wherein the measure of the deviation of the predicted 3D resist profile with respect to the desired 3D resist profile includes differences between predicted critical dimensions (CDs) and target CDs at multiple resist heights.

9. The method of claim 6, wherein determining the set of retargeted patterns based on the set of target patterns comprises:
  computing etch biases at a set of evaluation points in the set of target patterns by using an etch-bias model; and
  determining the set of retargeted patterns by adjusting the set of target patterns based on the computed etch biases.

10. The method of claim 9, wherein the etch bias model comprises one or more of the following terms:
  a constant bias,
  a short range density function,
  a long range density function,
  a visible area function,
  a blocked area function, and
  a function of a sidewall slope of a post-development resist layer.

11. An apparatus, comprising:
  a processor; and
  a non-transitory computer-readable storage medium storing instructions that, when executed by the processor, cause the apparatus to perform a method to determine a set of mask patterns for printing a set of target patterns by using a semiconductor manufacturing process, wherein the semiconductor manufacturing process includes a photolithography process and an etching process, the method comprising:
    determining a set of retargeted patterns based on the set of target patterns; and
    determining the set of mask patterns based on the set of retargeted patterns by optimizing an objective function that comprises a measure of a deviation of a predicted three-dimensional (3D) resist profile with respect to a desired 3D resist profile, wherein the measure of the deviation of the predicted 3D resist profile with respect to the desired 3D resist profile includes an inverse of a predicted resist sidewall slope.

12. The apparatus of claim 11, wherein the method further comprising creating a photolithography mask containing the set of mask patterns.

13. The apparatus of claim 11, wherein the measure of the deviation of the predicted 3D resist profile with respect to the desired 3D resist profile includes differences between predicted critical dimensions (CDs) and target CDs at multiple resist heights.

14. The apparatus of claim 11, wherein determining the set of retargeted patterns based on the set of target patterns comprises:
  computing etch biases at a set of evaluation points in the set of target patterns by using an etch-bias model; and
  determining the set of retargeted patterns by adjusting the set of target patterns based on the computed etch biases.

15. The apparatus of claim 14, wherein the etch bias model comprises one or more of the following terms:
  a constant bias,
  a short range density function,
  a long range density function,
  a visible area function,
  a blocked area function, and
  a function of a sidewall slope of a post-development resist layer.

* * * * *